Jan. 5, 1932.          G. TANNER          1,839,713
DOGGING MECHANISM
Filed May 31, 1930          2 Sheets-Sheet 2
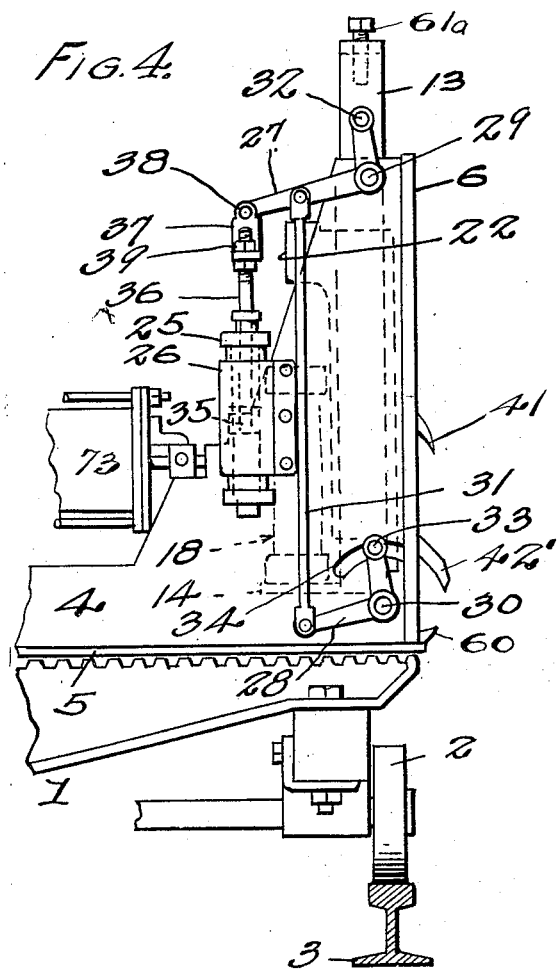
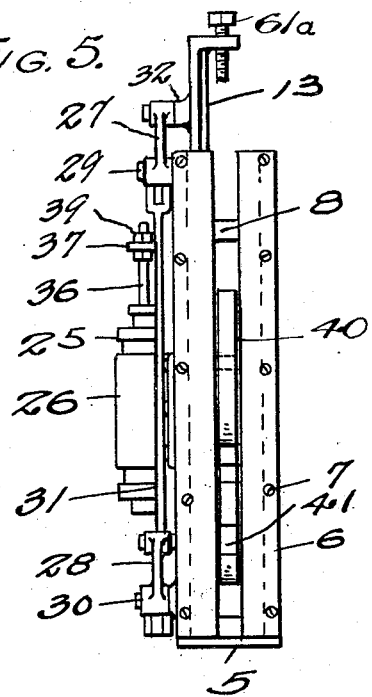
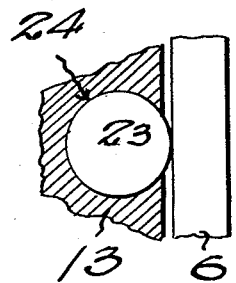
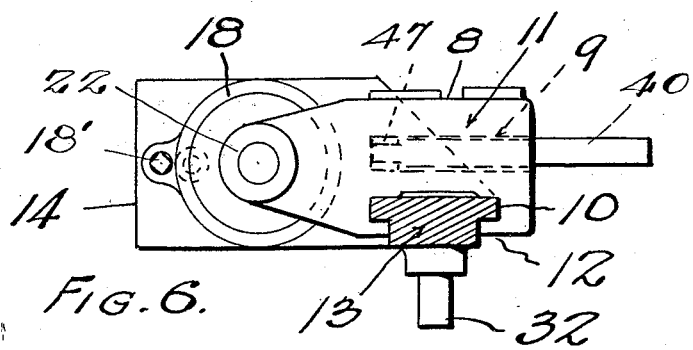
Inventor
GEORGE TANNER
By Herbert E. Smith
Attorney Patented Jan. 5, 1932

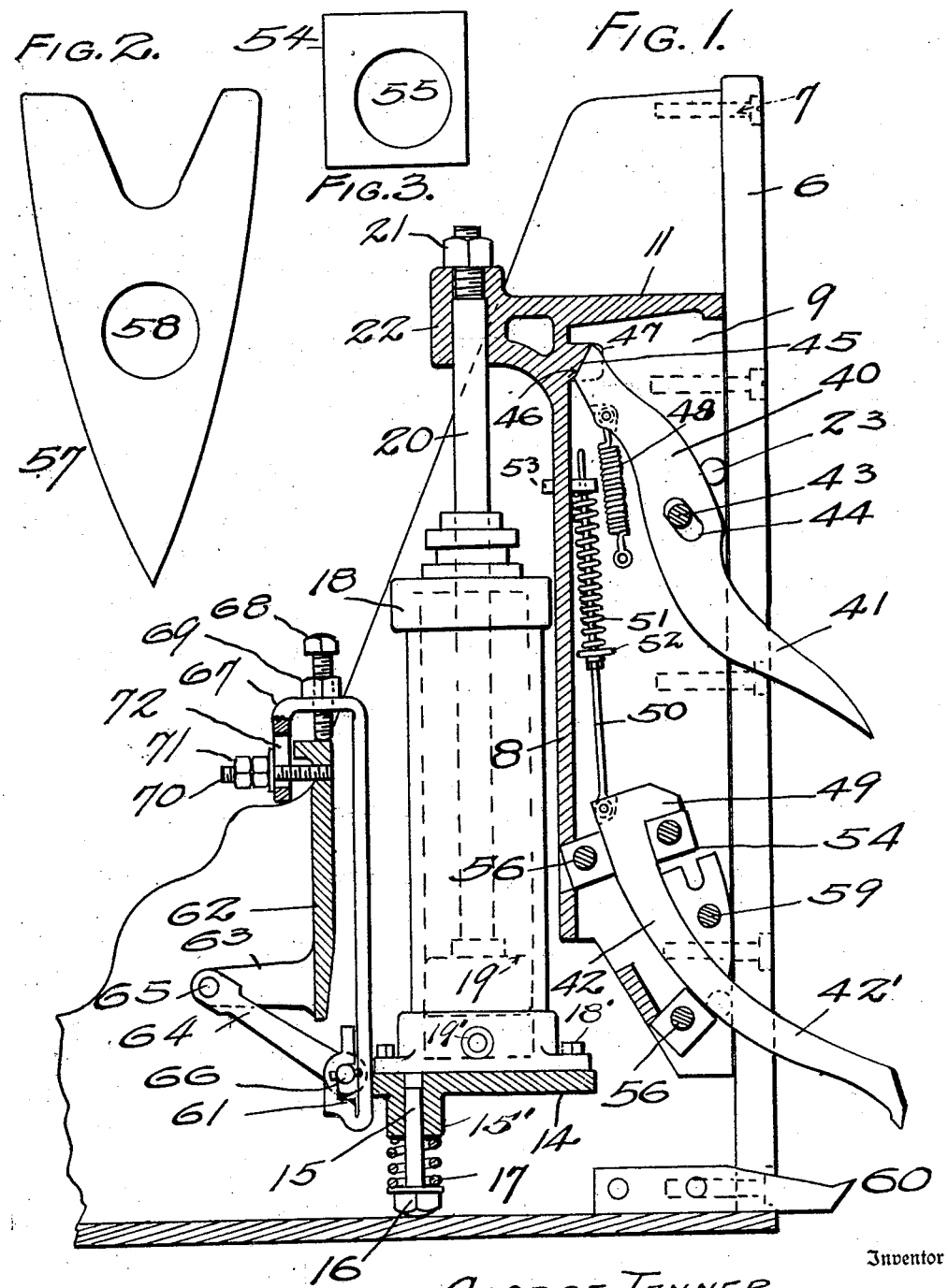

1,839,713

UNITED STATES PATENT OFFICE

GEORGE TANNER, OF SANDPOINT, IDAHO

DOGGING MECHANISM

Application filed May 31, 1930. Serial No. 458,524.

My present invention relates to improvements in dogging mechanism for saw mill set works. The invention is embodied with the transversely sliding knee which is mounted on the longitudinally moving head block or beam of the saw mill set works. The dogging mechanism includes a pair of dogs and means are provided whereby the dogs may be moved vertically as well as horizontally with relation to the knee and to the log to be sawed, and motive fluid operating devices are utilized for accomplishing the movements of the dogging mechanism. Means are provided for cushioning the horizontal movement of the dogging mechanism, and also for resiliently supporting the mechanism, as will be described. Means are also provided for taking up wear of operating parts to insure at all times a compact arrangement of the operating parts, and a durable, strong, and efficient mechanism is provided for rigidly holding the log in position to insure accuracy in cuts of the timber.

The invention consists in certain novel combinations and arrangements of parts as will hereinafter be more fully set forth and claimed. In the accompanying drawings I have illustrated one complete example of the physical embodiment of my invention wherein the parts are combined and arranged according to the best mode I have thus far devised for the practical application of the principles of my invention.

Figure 1 is a vertical sectional view through one of the knees, showing the dog holder also in section, and illustrating the arrangement of the dogs.

Figure 2 is a face view of one of the interchangeable wear blocks or plates, and Figure 3 is a face view of another form of interchangeable block or plate used in the mechanism.

Figure 4 is an exterior view of one of the knees with the dogging mechanism mounted thereon and therein, and showing also other parts of the carriage to indicate the relation of parts.

Figure 5 is a face view of the knee in Figure 4, other parts of Figure 4 being omitted.

Figure 6 is a top plan view of the dog holder showing its relation to the supporting and guiding bar for the holder, the bar being shown in section.

Figure 7 is a detail view showing one of the anti-friction rollers between the dog holder and a face plate of the knee.

In order that the general arrangement and relation of parts may readily be understood reference should first be had to Figure 4 where the usual head block or beam 1, forming part of the saw mill carriage, is shown, and the carriage travels toward and away from the saw with its wheels 2 rolling on the tracks or rails 3.

The sliding knee 4 reciprocates toward the right and left in Figure 4 transversely of the carriage between cutting or sawing operations, and this knee, which is hollow, has a base or bottom plate 5, and a pair of spaced face plate 6 that are secured, as by screws 7 to the side walls of the knee.

The dog holder 8 is disposed in upright position back of the face plates and between the side walls of the knee, and the holder is fashioned with two vertical slots 9, and 10, the former as housings for the dogs 41 and 42, and the side slot 10 for co-action with the upright guide bar 13.

The upper end of the dog holder is closed as at 11, except for the slot 10, and the slot 9 is open from the top 11 to the bottom of the holder. The slot 10 opens at one side of the holder, and its walls are provided with retaining flanges 12 that co-operate with the grooved side edges of the guide bar 13 as the holder is raised or lowered with relation to the guide bar.

At the lower end of the guide bar a base plate 14 is suitably fixed thereto, in horizontal position, and this face plate is resiliently supported from the base plate 5 of the knee by means of a headed pin or bolt 15, with its head 16 in position to slide on the upper face of the plate 5. The pin projects loosely into a socket 15' of the plate 14, and a spring 17 coiled about the pin and located between the head of the pin and the wall of the socket provides a resilient support for the guide bar when it is located at its lowermost position.

The head of the pin rides over the base plate 5 when the dogging mechanism is reciprocated in the knee, for projecting or retracting the dogs through the front of the knee.

For raising or lowering the dog holder with relation to its guide bar I employ air pressure in the upright cylinder 18 for pressure against a piston 19 which has a stem 20 that projects from the upper end of the cylinder to the top of the holder. At the back of the holder and at its upper end a hollow boss 22 is fashioned to receive the stem, and lock nut 21 secures the stem to the boss in order that the holder may be moved with the stem. At its lower end the air cylinder is secured as by bolts 18' to the plate 14 of the guide bar, and it will thus be apparent that the cylinder is rigid with the guide bar while the holder is rigid with the stem and piston. Air may be admitted under pressure through port 19' to elevate the holder, or pressure may be permitted to escape through the port to permit lowering of the holder and its dogs.

Two pairs of anti-friction rollers as 23 are carried in sockets 24 located at opposite sides of the slot 9 of the holder, and these sockets, as best seen in Figure 7 have open fronts in order that the rollers may engage and roll on the inner faces of the two face plates as the holder vertically reciprocates.

In addition to the vertical movement of the dog holder, the latter, together with its guide bar, plate 14 and cylinder 18, also has a horizontal movement, and this latter movement is accomplished by the use of air under pressure in the air cylinder 25 that is secured as by bracket 26 to the outside face of the knee 4.

Two bell crank levers 27 and 28 are supported on the pivot pins 29 and 30, the former near the top of the knee and the latter near the bottom of the knee, and these two levers are connected by link or rod 31 to move in unison, exterior of the knee.

The bell crank levers are pivotally connected to the guide-bar of the dog holder by trunnions 32 and 33, the former projecting laterally from the bar above the knee, and the latter projecting laterally of the bar through an arcuate slot 34 in one wall of the knee. The connections between the bell crank levers and the guide bar are such that the latter may be shifted or swung on the pivots 29 and 30 to project or retract the dogs with relation to the face plates 6 of the knee.

As best seen in Figure 4 the air cylinder 25 has a piston 35 (dotted lines) reciprocable therein, and the stem 36 of the piston projects through the upper end of the cylinder. At its upper end the stem has a shackle 37 that is pivoted at 38 to the long arm of the bell crank lever 27, and the shackle, which is L-shaped, has a hole therein for the stem, and lock nuts 39 are employed to lock the shackle rigidly on the stem.

The admission and exit of air under pressure to and from the cylinder 25 is properly controlled by usual control means for swinging the dog holder, and it will be apparent that the spring 17 is instrumental in cushioning the movement of the holder and other parts rigid therewith or carried therewith.

The upper dog 40 is fashioned with a point or tooth 41, and the lower dog 42 has a special tooth 42', and both dogs, as shown may be projected or retracted through the front of the knee.

The upper dog 40 is supported in the slot 9 or housing of the dog holder, and the dog is fashioned with a slot 44 that permits relative movement of the dog. At its upper end the dog is fashioned with a cam edge or face 45 that bears against a complementary cam face 46 formed in the holder, and spaced ears 47 enclose the cam head 45 of the dog. An expansion spring 48 is connected at one end to the dog and at its other end to the holder, the tendency of the spring being to pull down on the upper end of the dog and project its point 41.

The lower dog 42 is fashioned with a head 49, and a spring rod 50 is pivoted to the head within the holder. A spring 51 is coiled about the rod and interposed between a collar 52 fixed on the rod and a supporting pin 53 rigid with the holder, the pin being perforated for the rod, and the perforated pin forms a guide for the rod.

The lower dog is curved as shown and it is supported in the holder by a number of wear blocks 54, here shown as three in number and of square shape, with a hole 55 in the blocks. As best seen in Figure 3 the hole 55 is set eccentrically in the square block in order that the four faces of the block are at varying distances from the center of the hole. These blocks are supported on pins 56 that extend transversely through one side wall of the dog holder and across the slot or housing 9 of the holder. In addition to the square blocks, I utilize another block as 57 having somewhat of a heart shape, and provided with an opening or hole 58. This hole, as best seen in Figure 2 is arranged off the center of the longitudinal axis of the block, and one convex face of the block is farther from the center of the hole than the opposite convex face.

The blocks 57 is located in front of the lower dog, just within the face plates 6, and it occupies the width of the slot 9 as do also the blocks 54. The wear block 57 is supported on a transverse pin 59 similar to the pins 56, and it will be apparent in Figure 2 that the lower dog is confined between the square blocks 54 and the heartshape block 57. The dog is permitted to slide between the blocks, and the spring 51 tends to hold the dog down, with its head 49 resting on one of the blocks 54.

The lower dog is designed for use with logs of small diameter and it is so arranged within the wear blocks as to draw the log toward the knee as the dog penetrates the log. Thus, when the holder is lowered to engage the point 42' of the dog with the log, the upward pressure on the curved dog is received by the convex wear face of the block 57, and lateral thrust is taken up by the two square wear blocks 54 at the left side or rear of the dog. The upward "give" of the dog against the tension of spring 51 pulls the tooth 42' toward the knee, and thereby the log is drawn up against the face plates of the knee, and there held by the tooth to insure an accurate cut of the log.

The upper dog, which is used for a log of larger diameter, also draws the log in toward the knee as its point 41 penetrates the log. This pull or draw on the log is accomplished by the co-acting cam portions 45 and 46, as the dog is moved upwardly and inwardly, and guided by the pin and slot arrangement 43 and 44. As the dog is pushed upwardly, the cam action swings the head or upper end of the dog to the right in Figure 1, and of course the tooth or point of the dog is swung to the left. After the dog is released from the log the spring 48 returns the dog to normal position.

With respect to dog 42 it will be apparent that as the edges of the dog wear, or if the wear edges of the blocks 54 and 57 become worn, thus permitting undesirable looseness of the dog in its bearings, the blocks may be turned so that a fresh wear edge of the blocks may be frictionally engaged by the concave and convex edges of the dog.

A fixed dog 60, as usual, is carried at the lower end of the knee, and performs its functions in well known manner.

At its rear, the dog holder is provided with means for retaining the dogging mechanism, including the dog holder and guide bar against looseness, and to absorb or cushion shocks, as well as to take up wear. This cushion includes a vertically suspended spring blade or resilient plate 61 that is supported from and in front of a transverse partition 62 of the knee.

At its lower end, the partition 62, which is rigid with the knee is provided with an offset lug 63, and a link 64 joins the cushion with the lug by pivot pins 66 and 65. The lower end of the spring blade or cushion 61 bears against the rear edge of the plate 14 of the cylinder 18, and it will be apparent that as the plate 14 is moved to the left in Figure 1 the cushion or spring blade is flexed to absorb the movement.

The spring blade is fashioned at its upper end with an inverted U-shape as 67 that straddles the upper end of the fixed plate or partition 62, and the cushion may be vertically adjusted by means of an adjusting bolt 68, and locked in adjusted position by the nut 69. The bolt bears against the upper edge of the partition, and of course by turning the bolt clock-wise the cushion is lifted. The spring blade is also retained with relation to the partition by means of a bolt 70 threaded into the partition from the rear. Lock nuts 71 on the bolt 70 clamp the U-shaped end on the partition, and the U-shaped end is slotted at 72 to permit this adjustment. The numeral 73 in Figure 4 indicates the position of the taper set cylinder with relation to the dogging mechanism, but is not herein claimed.

Assuming that the teeth of the dogs are to be set so that they will recede toward and to within ½ inch of the face plates with a cushioned stop to prevent wear and tear of the parts, the nuts 39 on stem 36 are first loosened, and the stem is pushed downwardly until the piston 35 contacts with the bottom of the cylinder 25. The threaded end of the stem 36 is then turned in the L-shaped shackle to swing the bell crank levers 27 and 28 on their pivots, until, through the action of the bell cranks the dog holder advances its dogs with their points about ¼ inch beyond the outer faces of the face plates. Then the lock nuts 39 are tightened on the stem and shackle to hold the parts in adjusted position.

The adjustment of the piston in the cylinder 25 provides a space in the lower end of the cylinder, below the piston 35 in order that, after the dogs have been projected to engage a log, and are pulling the log toward the face plates 6, the cylinder and piston may act as a dash-pot or pneumatic cushion for the dogging mechanism, and the spring blade 61 acts as a mechanical cushion for the mechanism.

The vertical adjustment or movement of the dog holder is limited by the use of a set bolt or stop bolt 61a secured in the upper end of the guide bar 13 of the dog holder.

The knee is advanced and receded in well known manner, and as the reciprocating movements of the knee are usually abrupt, these movements are cushioned and the shocks are absorbed by the pneumatically operating receding mechanism indicated at 62 in Figure 1.

Having thus fully described my invention, what I claim as new and desire to secure by Letters Patent is:—

1. The combination with a vertically reciprocable dog holder, of a spring operated dog carried by the holder and relatively movable thereto, and co-acting means on the dog and holder for moving the dog to draw a log toward the holder as the dog engages with a log.

2. The combination with a knee, a dog holder and a relatively movable dog carried by the holder, of co-acting means on the dog and holder for drawing a log to the knee as the dog engages the log, and spring actuated means for returning the dog to normal position.

3. The combination with a dog holder and a dog mounted therein, of means within the holder for co-action with the dog for automatically drawing the tooth of the dog toward the holder as the dog recedes within the holder under impact of its tooth with the log.

4. The combination with a dog holder having a pivot pin, of a slotted dog pivoted on the pin, a cam face in the holder, a cam head on the dog for co-action with the face, and a return spring for the dog.

5. The combination with a knee, of a guide bar suspended within the knee, a vertically reciprocable dog holder mounted on the guide bar, anti-friction rollers carried by the holder for engagement with the knee, and a pair of dogs for selective use mounted in the holder.

6. The combination with an enclosing knee, of an upright guide bar mounted therein, a slotted dog holder mounted on the guide bar and means for raising or lowering the holder, a dog supported within the holder, and means co-acting with the dog for automatically drawing the tooth of the dog toward the knee as the holder is lowered.

In testimony whereof I affix my signature.

GEORGE TANNER.